United States Patent
Sakai et al.

(10) Patent No.: US 8,674,575 B2
(45) Date of Patent: Mar. 18, 2014

(54) PERMANENT MAGNET ELECTRIC MOTOR INDUCING SHORT CIRCUIT CURRENT IN SHORT CIRCUIT COIL

(75) Inventors: Kazuto Sakai, Yokosuka (JP); Yutaka Hashiba, Yokosuka (JP); Yosuke Otsubo, Yokkaichi (JP); Yusuke Matsuoka, Mie-gun (JP); Norio Takahashi, Izumi-ku (JP); Tadashi Tokumasu, Setagaya-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 13/000,227

(22) PCT Filed: Jun. 19, 2009

(86) PCT No.: PCT/JP2009/002812
§ 371 (c)(1),
(2), (4) Date: Mar. 24, 2011

(87) PCT Pub. No.: WO2009/154007
PCT Pub. Date: Dec. 23, 2009

(65) Prior Publication Data
US 2011/0175478 A1 Jul. 21, 2011

(30) Foreign Application Priority Data

Jun. 20, 2008 (JP) ................... 2008-162203

(51) Int. Cl.
*H02K 21/46* (2006.01)
*H02K 1/26* (2006.01)
*H02K 1/27* (2006.01)

(52) U.S. Cl.
USPC ....... 310/156.74; 310/181; 310/182; 310/183

(58) Field of Classification Search
USPC ........... 310/156.74, 156.75–156.77, 181–183
IPC ..................................... H02K 1/27,1/26, 21/46
See application file for complete search history.

(56) References Cited

U.S. PATENT DOCUMENTS 8,198,774 B2 * 6/2012 Takashima et al. ...... 310/156.43
(Continued)

FOREIGN PATENT DOCUMENTS

| JP | 8 182282 | 7/1996 |
| JP | 2006 280195 | 10/2006 |

(Continued)

OTHER PUBLICATIONS

Machine translation of WO2008/023413A1 (translated May 21, 2013, published Feb. 28, 2008).*

(Continued)

*Primary Examiner* — Burton Mullins
*Assistant Examiner* — Michael Andrews
(74) *Attorney, Agent, or Firm* — Oblon, Spivak, McClelland, Maier & Neustadt, L.L.P.

(57) ABSTRACT

An increase of the magnetization current can be restrained during demagnetization and magnetization, and a variable speed operation can be achieved at a high power output over a wide range of from a low speed to a high speed. A rotor 1 is configured by a rotor core 2, permanent magnets 3 having a small value as the product of the coercivity and the thickness in the magnetization direction thereof, and permanent magnets 4 having a large value as the product. When reducing a flux linkage of the permanent magnets 3, a magnetic field directed to the reverse direction of the magnetization direction of the permanent magnets 3 due to a current of an armature coil is caused to act on them. When increasing a flux linkage of the permanent magnets 3, a magnetic field directed to the same direction as the magnetization direction of the permanent magnets 3 due to a current of an armature coil is caused to act on them. A short circuit coil 8 is located in a magnetic path part of each permanent magnet 4 other than the permanent magnets 3. A magnetic field due to a magnetization current induces an induced current to generate a magnetic field on the periphery of the short circuit coil 8. The generated magnetic field and the magnetization current generate a magnetic field to magnetize the permanent magnets 3.

7 Claims, 8 Drawing Sheets

(56) References Cited

U.S. PATENT DOCUMENTS

| | | | |
|---|---|---|---|
| 2007/0108862 A1* | 5/2007 | Sasaki et al. | 310/156.78 |
| 2009/0236923 A1* | 9/2009 | Sakai et al. | 310/156.43 |
| 2009/0261774 A1* | 10/2009 | Yuuki et al. | 310/156.01 |
| 2010/0171385 A1 | 7/2010 | Sakai et al. | |

FOREIGN PATENT DOCUMENTS

| | | | | |
|---|---|---|---|---|
| JP | 2008 29148 | | 2/2008 | |
| JP | 2008 048514 | | 2/2008 | |
| JP | 2008029148 A | * | 2/2008 | ............... H02K 1/27 |
| JP | 2008125201 A | * | 5/2008 | ............. H02K 19/10 |
| WO | 2008 023413 | | 2/2008 | |
| WO | WO 2008023413 A1 | * | 2/2008 | ............... H02K 1/27 |

OTHER PUBLICATIONS

Machine translation of JP2008-125201A (translated May 21, 2013, published May 29, 2008).*

International Search Report issued Sep. 8, 2009 in PCT/JP09/002812 filed Jun. 19, 2009.

Combined Office Action and Search Report issued Jul. 15, 2013 in Chinese Patent Application No. 200980123036.6 with English translation of categories of cited documents.

* cited by examiner

PRIOR ART

PRIOR ART

PERMANENT MAGNET ELECTRIC MOTOR INDUCING SHORT CIRCUIT CURRENT IN SHORT CIRCUIT COIL

FIELD

This invention relates to a permanent magnet electric motor in which two or more types of permanent magnets are engaged and the magnetic flux of at least one of the permanent magnets is changed quantitatively and irreversibly so that a variable speed operation is achieved over a wide range of from a low speed to a high speed. In particular, this invention relates to a permanent magnet electric motor in which a short circuited coil or conductive plate is located in a rotor core such that the magnetic flux of at least one permanent magnet can be changed quantitatively and irreversibly without being restrained by the influence of the magnetic flux of another permanent magnet.

BACKGROUND

In general, permanent magnet electric motors are broadly classified into two categories, that is, "surface permanent magnet motor" in which a permanent magnet is attached on the outer part of a rotor core, and "interior permanent magnet motor" in which a permanent magnet is embedded in a rotor core. Among these, the "interior permanent magnet motor" is suitable for use as a variable speed drive motor.

In a permanent magnet electric motor, the flux linkage of a permanent magnet is generated constantly and uniformly, as a result, an induced voltage due to the permanent magnet increases in proportion to the rotational speed. Consequently, during a variable speed operation from a low speed to a high speed, a high speed rotation causes a very high induced voltage (counter electromotive voltage) due to the permanent magnet. If the induced voltage due to the permanent magnet is applied to an electronic component of an inverter and increases up to equal to or more than the withstand voltage thereof, the electronic component results in dielectric breakdown. For avoiding such a result, a design is considered, in which the magnetic flux of a permanent magnet is reduced such that an induced voltage due to a permanent magnet is equal to or less than the withstand voltage of an electronic component of an inverter, but this design causes a reduction of output and efficiency in a low speed range of the permanent magnet electric motor.

During a variable speed operation approximating to constant output from a low speed to a high speed, the flux linkage of a permanent magnet is generated uniformly, in a high speed rotation range, the voltage of the motor reaches the upper limit of the power supply voltage and the current required for output is not to flow. As a result, in the high speed rotation range, the output is reduced significantly, and furthermore, a variable speed operation can not be performed over a wide range up to a high speed rotation Recently, "flux weakening control", which is described in various documents, has come to be applied to a method for enlarging the variable speed range. The total flux linkage quantity of an armature coil is determined from the magnetic flux due to a d-axis current and the magnetic flux due to a permanent magnet thereof. In the "flux weakening control", a magnetic flux is generated by a minus d-axis current, and this flux due to the minus d-axis current causes reduction of the total flux linkage quantity. Further, in the "flux weakening control", a permanent magnet with a high coercivity is adopted such that a working point of a magnetic characteristic (B-H characteristic) may change in the reversible range. Consequently, an NdFeB magnet with a high coercivity is applied to that of a permanent magnet electric motor such that the permanent magnet is irreversibly demagnetized by a demagnetizing field under the "flux weakening control".

In operations applying the "flux weakening control", the flux due to the minus d-axis current causes reduction of the flux linkage quantity, as a result, the reduced quantity of flux linkage generates a voltage to spare in relation to the upper limit voltage. An electric current to be a torque component increases, as a result, the output of a high speed range increases. In addition, the rotational speed increases in proportion to the voltage to spare, and this enlarges the range of the variable speed operation.

However, since a minus d-axis current does not contribute to the output, causing the minus d-axis current to flow constantly results in that the copper loss increases and the efficiency is deteriorated. Further, the demagnetizing field due to the minus d-axis current generates a harmonic flux, and increase of voltage due to the harmonic flux or the like makes a limit of voltage reduction due to the "flux weakening control". For these reasons, even if "flux weakening control" is applied to an "interior permanent magnet motor", it is impossible to perform a variable speed operation more than three times of a base speed. Further, there is a problem that the harmonic flux as described above causes an increase of iron loss and a substantial reduction of efficiency in a low and middle speed range. In addition, there is a possibility of generating a vibration as a result of electromagnetic force due to the harmonic flux.

When an "interior permanent magnet motor" is applied to a motor for driving a hybrid car, the motor is brought around at the state of only engine drive. In a middle and high speed rotation, an induced voltage of the motor due to a permanent magnet rises, for restraining the induced voltage to be equal to or less than the power supply voltage, a minus d-axis current is caused to flow constantly by the "flux weakening control". In this state, the motor generates only loss, as a result, an overall operating efficiency deteriorates.

When an "interior permanent magnet motor" is applied to a motor for driving an electric train, since the electric train runs by inertia at a state, similarly as described above, for restraining an induced voltage of the motor due to a permanent magnet to be equal to or less than the power supply voltage, a minus d-axis current is caused to flow constantly by the "flux weakening control". In this case, the motor generates only loss, as a result, an overall operating efficiency deteriorates.

As a technique for solving these problems, in Patent Document 1 and Patent Document 2, a technique is described, which arranges permanent magnets with a low coercivity such as to change magnetic flux density irreversibly due to a magnetic field generated by a stator coil, and permanent magnets with a high coercivity that is equal to or more than twice as much as that of the permanent magnets with a low coercivity, and adjusts the total flux linkage quantity by magnetizing the permanent magnets with a low coercivity by magnetic fields due to current such that the total flux linkage due to the permanent magnets with a low coercivity and the permanent magnets with a high coercivity is reduced in a high speed rotation range in which the voltage is equal to or more than the maximum voltage of the power supply voltage.

A permanent magnet electric motor of Patent Document 1, has a rotor 1 that is configured as shown in FIG. 9. Here, the rotor 1 is configured by a rotor core 2, eight permanent magnets with a low coercivity 3 and eight permanent magnets with a high coercivity 4. The rotor core 2 is configured by layering silicon steel plates, the low coercivity permanent magnets 3 are Al—Ni—Co magnets or FeCrCo magnets, and the high coercivity permanent magnets 4 are NdFeB magnets.

The low coercivity permanent magnets 3 are embedded in the rotor core 2, and first type of cavities 5 each are provided at the opposite ends of the low coercivity permanent magnets 3. The low coercivity permanent magnets 3 each are arranged along with the radial direction of the rotor that matches the q-axis as a center axis between magnetic poles, and magnetized in the orthogonal direction to the radial direction. The high coercivity permanent magnets 4 are embedded in the rotor core 2, and second type of cavities 6 each are provided at the opposite ends of the high coercivity permanent magnets 4. The high coercivity permanent magnets 4 each are arranged approximately along with the round of the rotor 1 such that the high coercivity permanent magnets 4 each are put between two low coercivity permanent magnets 3 on the inner side of the rotor 1. The high coercivity permanent magnets 4 each are magnetized in the orthogonal direction to the round of the rotor 1.

The magnetic pole parts 7 each are formed such that they are surrounded by two low coercivity permanent magnets 3 and one high coercivity permanent magnet 4. The center axis of the magnetic poles 7 is d-axis, and the center axis between each two magnetic poles 7 is the q-axis. In the permanent magnet electric motor of Patent Document 1 which adopts this rotor 1, pulse-like currents are flowed through stator coils in an extremely short conductive time (about 100 μs to 1 ms) to form magnetic fields, and thereby the magnetic fields act the low coercivity permanent magnets 3. When a magnetized magnetic field is 250 kA/m, ideally, a sufficient magnetized magnetic field act the low coercivity permanent magnets 3, and the high coercivity permanent magnets 4 are not irreversibly demagnetized due to the magnetization.

As a result of this, with the permanent magnet electric motor of Patent Document 1, the flux linkage of the low coercivity permanent magnets 3 changes from the maximum value to zero, and magnetization can be made in the two directions of forward and reverse. In other words, if the flux linkage of the high coercivity permanent magnets 4 is directed in a forward direction, the flux linkage of the low coercivity permanent magnets 3 can be adjusted in a range of from the maximum value of the forward direction to zero, and furthermore, over a wide range up to the maximum value of the reverse direction. Consequently, in the rotor 1, the low coercivity permanent magnets 3 are magnetized by a d-axis current, as a result, the total flux linkage quantity can be adjusted over a wide range, which is obtained by summing up that of the low coercivity permanent magnets 3 and that of the high coercivity permanent magnets 4.

For example, in a low speed range, when the low coercivity permanent magnets 3 are magnetized by a d-axis current such that the flux linkage of the low coercivity permanent magnets 3 shows the maximum value in the same direction (in a initial state) of the flux linkage of the high coercivity permanent magnets 4, the torque due to the permanent magnets reaches the maximum value, and this allows the torque and output of the motor to be the maximum. In a middle and high speed range, when the magnetic flux is reduced and the total flux linkage quantity is reduced, the voltage of the motor is reduced, and this generates a voltage to spare in relation to the upper limit of the power supply voltage, and allows the rotation speed (frequency) to be higher.

Patent Document 1: Japanese Patent Application Laid-open No. 2006-280195 Patent Document 2: Japanese Patent Application Laid-open No. 2008-48514

The permanent magnet electric motor of Patent Document 1 which is configured as described above, has an excellent characteristics that the flux linkage quantity of the low coercivity permanent magnets 3 changes over a wide range of from the maximum value to zero by a d-axis current of the rotor 1, and that and magnetization can be made in the two directions of forward and reverse. On the other hand, a large magnetization current is required when magnetizing the low coercivity permanent magnets 3, this allows an inverter for driving the motor to be enlarged.

In particular, in view of characteristics of permanent magnets, a large magnetization current is required when magnetization compared with when demagnetization. However, since the permanent magnet electric motor of Patent Document 1 has a configuration in which two types of magnets are arranged magnetically in parallel, by the influence of the flux linkage of the high coercivity permanent magnets 4, a large magnetic field is required for magnetization of the low coercivity permanent magnets 3.

FIGS. 10(A) to 10(D) are schematic diagrams illustrating this. In the permanent magnet electric motor of Patent Document 1, as shown in FIG. 10(A), two low coercivity permanent magnets 3 and one high coercivity permanent magnet 4 are arranged in a U-shape such that d-axis is center of the U-shape. In a normal state of the motor, the flux of the permanent magnets 3 and 4 is directed in the direction of the center magnetic pole part 7. In this state, when a d-axis current is flowed in pulse-like to generate a magnetic field for demagnetization, the flux of the magnetic field is generated such that the flux goes through each of the permanent magnets 3 and 4 from the outer side of the rotor 1, as shown in FIG. 10(B), resulting in that the low coercivity permanent magnets 3 are demagnetized. In this case, since the high coercivity permanent magnet 4 has a high coercivity, the magnet 4 is not demagnetized.

During the demagnetization process, as shown in FIG. 10(C), the flux of the high coercivity permanent magnet 4 is flowed in the d-axis direction and in the direction of going from the inner side to outer side of the low coercivity permanent magnets 3, that is, in the reverse direction of an initial direction of the flux of the low coercivity permanent magnets 3, thereby the high coercivity permanent magnet 4 assists the demagnetization due to a magnetic field generated by a d-axis current. Consequently, the demagnetization can be made up to the reverse of the polarity of the low coercivity permanent magnets 3.

On the other hand, when a magnetization process, a d-axis current is applied in pulse-like again, as shown in FIG. 10(D), a magnetic field is generated in the reverse direction to that of FIG. 10(B), the flux in the reverse direction which configures the magnetic field, restores the flux linkage of the demagnetized low coercivity permanent magnets 3 to the state of a normal operation. However, essentially, a large energy is required for the magnetization compared with the de magnetization, in addition to this, as shown in FIG. 10(D), the flux of the high coercivity permanent magnet 4 is applied to the low coercivity permanent magnets 3 in the direction of demagnetizing the low coercivity permanent magnets 3, as a result, a large magnetization currant is required, which can generate a large magnetic field to overcome this.

As described above, in the permanent magnet electric motor of Patent Document 1, since the two types of magnets are arranged magnetically in parallel, there are merits such as a large magnetization of the low coercivity permanent magnets 3 and increase of the variation of the magnetic force such as from zero to 100%, but there is a demerit in which a large magnetization currant is required for a magnetization process.

This invention is proposed to solve the problems described above, and has as an object the provision of a permanent magnet electric motor which can reduce a magnetization current when magnetizing low coercivity permanent magnets, thereby which, without enlarging an inverter, can perform a variable speed operation over a wide range of from a low speed to a high speed, as a result, which can contribute to a high torque in a low speed rotation range, a high power output in a middle and high speed rotation range, and an improvement of efficiency.

SUMMARY

In order to attain the above object, as one aspect of this invention, a permanent magnet electric motor has the following technical features. In the permanent magnet electric motor, a magnetic poles are formed by using more than two types of magnets selected such that the product of the coercivity and the thickness in the magnetization direction of each magnet is different from that of another magnet in use, a rotor is formed by locating a plurality of the magnetic poles inside a rotor core, a stator is located outside the rotor with an air gap intervening between them, the stator has an armature core and an armature coil, and at least one of the permanent magnets configuring each magnetic pole of the rotor is magnetized by a magnetic field generated by a current of the armature coil so that the magnetic flux of the at least one permanent magnet is changed quantitatively and irreversibly. The permanent magnet electric motor further has a short circuit coil located on the periphery of a magnet, which is other than the at least magnet to be irreversibly changed, wherein the short circuit coil is located in a magnetic path part that allows a magnetic flux generated by the magnet to pass through itself.

As another aspect of this invention, the short circuit coil located on the periphery of a magnet other than the magnet to be irreversibly changed, may be located such that an axis extending in the magnetization direction of the magnet is the center axis of the short circuit coil, or may be located in a magnetic path part of the rotor core, which allows a magnetic flux to leak. Instead of using the short circuit coil, a conductive plate may be used.

As another aspect of this invention, the permanent magnet electric motor further may have one or more of technical features including: a feature in which conduction of a d-axis current through the armature coil is performed to generate a magnetic flux so that the generated flux a short circuit current in the short circuit coil or the conductive plate; a feature in which an inductance value and a resistance value of the short circuit coil or the conductive plate are set such that a short circuit current flow, which is such as to change a magnetization of the magnet to be irreversibly changed; and a feature in which the short circuit coil or the conductive plate is adapted such that a short circuit current flow within one second, which is such as to change a magnetization of the magnet to be irreversibly changed, subsequently, the short circuit current is attenuated by more than 50% within one second.

As another aspect of this invention, the permanent magnet electric motor further may have one or more of technical features including: a feature in which the short circuit coil or the conductive plate is held by the rotor core to a centrifugal force during a high speed rotation; a feature in which the short circuit coil or the conductive plate is adapted to generate a short circuit current, which is generated by flowing a current through the armature coil to form a magnetic field directed to the reverse direction of the direction in which the permanent magnet is irreversibly changed, subsequently, flowing a current through the armature coil to form a magnetic field directed to the direction in which the permanent magnet is irreversibly changed; and a feature in which the short circuit coil or the conductive plate is a result of flowing a conductive material melted by a high temperature in a hole of the rotor core to cast a coil or a plate.

By means of the permanent magnet electric motor according to this invention, when magnetizing the permanent magnets the magnetic flux of which is changed quantitatively and irreversibly, a magnetization current generates a magnetic field to flow an induced current through the short circuit coil or the conductive plate, as a result, the induced current further generates a magnetic field to cause a magnetic force to act on the permanent magnets the magnetic flux of which is changed quantitatively and irreversibly. Consequently, this magnetic field due to the induced current is added to the magnetic field due to the magnetization current, as a result, a magnetization of the permanent magnets, the magnetic flux of which is changed quantitatively and irreversibly, can be performed effectively.

In addition, a magnetic field generated by the short circuit coil or the conductive plate, acts to counteract a magnetic field generated by a magnetization current in not only the rotor but also the armature core. Consequently, since a magnetic saturation in the armature core is alleviated, a strong magnetic field due to a large magnetization current can be applied to the permanent magnets the magnetic flux of which is changed quantitatively and irreversibly, as a result, it is possible to magnetize the permanent magnets easily.

As described above, with this invention, it is possible to effectively magnetize the permanent magnets, the magnetic flux of which is changed quantitatively and irreversibly, by a small magnetization current, and it is possible to restrain a magnetic saturation of the armature core. Consequently, without enlarging a drive inverter, the efficiency of the permanent magnet electric motor can be improved.

EXPLANATION OF REFERENCE NUMERALS

Figure 1:
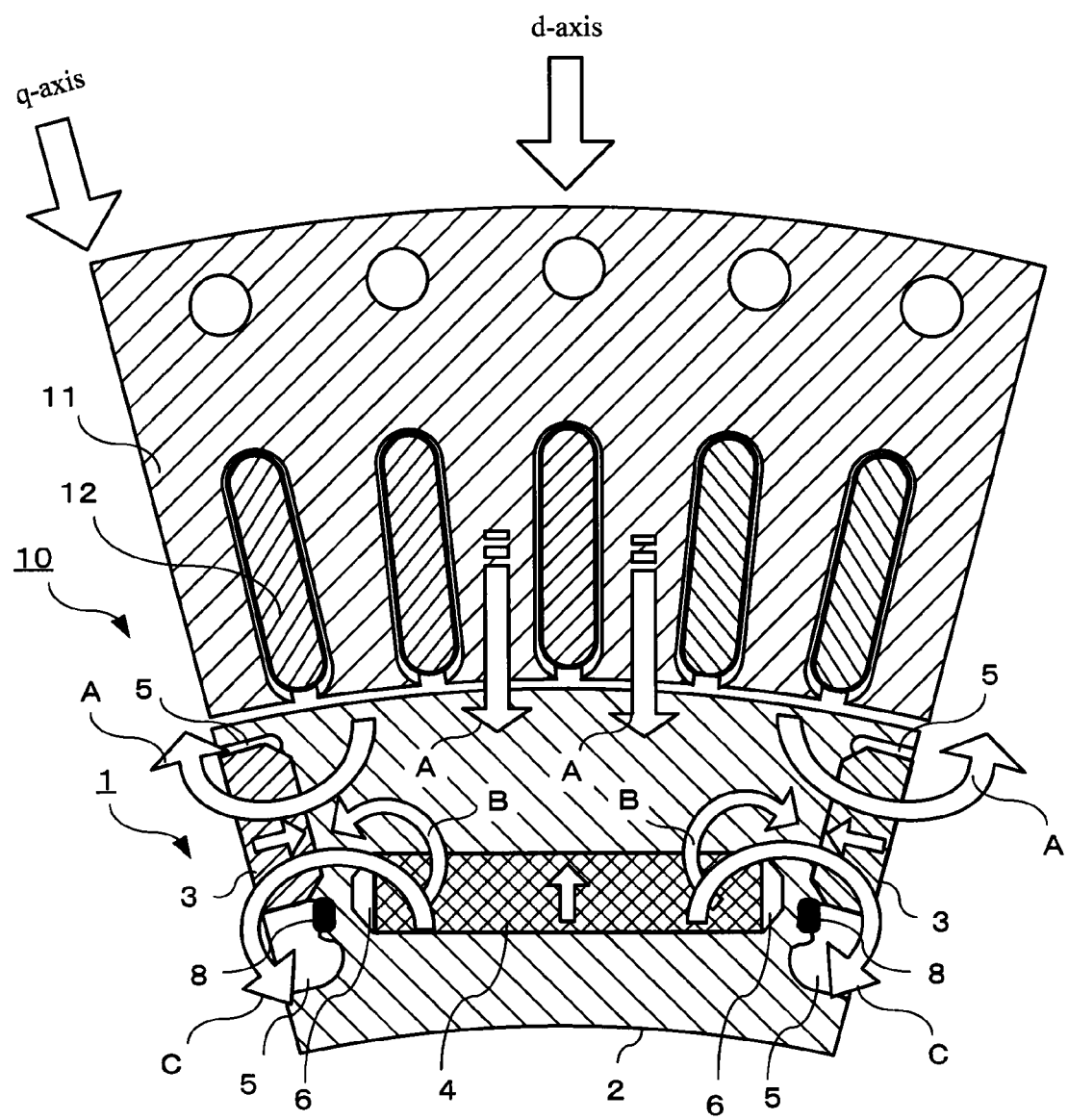
FIG. 1 is a partial sectional view showing a rotor and a stator in a state in which demagnetization has been started by a magnetization current in a first embodiment of the invention.

1 . . . rotor
2 . . . rotor core
3 . . . permanent magnet having a small value as the product of the coercivity and the thickness in the magnetization direction (ferrite magnet)
4 . . . permanent magnet having a large value as the product of the coercivity and the thickness in the magnetization direction (NdFeB magnet)
5 and 6 . . . cavity provided at an end of a permanent magnet
7 . . . magnetic pole part
8 . . . short circuit coil
9 . . . conductive plate
10 . . . stator
11 . . . armature core
12 . . . armature coil

DETAILED DESCRIPTION

Below, embodiments of permanent magnet electric motor according to this invention are explained in detail referring to the drawings. Note that the following embodiments are explained regarding a case of 12 pole motor, but this invention can be similarly applied to various motors having another number of poles.

First Embodiment

Configuration

A first embodiment of this invention is explained referring to FIG. 1 through FIG. 5. Note that for the purpose of simplicity, in each of FIGS. 1 through 5, only a partial configuration for one pole is shown among 12 poles, but needless to say, any of the 12 poles has a uniform configuration. In addition, FIG. 1 shows a rotor and a stator, but in FIG. 2 and subsequent FIGS. 3 through 5, the stator part is omitted.

In the first embodiment of this invention, as shown in FIG. 1, a rotor 1 is configured by a rotor core 2, permanent magnets 3 having a small value as the product of the coercivity and the thickness in the magnetization direction thereof, and permanent magnets 4 having a large value as the product of the coercivity and the thickness in the magnetization direction thereof. The rotor core 2 is configured by layering silicon steel plates, and the permanent magnets 3 and 4 are embedded in the rotor core 2. Cavities 5 and 6 are provided at the opposite ends of the permanent magnets 3 and 4, respectively, such that a magnetic flux passing through the rotor core 2, passes through the permanent magnets 3 and 4 in the thickness direction thereof.

Ferrite magnets or Al—Ni—Co magnets may be used as the permanent magnets 3 having a small value as the product of the coercivity and the thickness in the magnetization direction, but in this embodiment, as an example, a case of using ferrite magnets as the permanent magnets 3, is explained. Similarly, as an example, a case of using NdFeB magnets as the permanent magnets 4, is explained. The coercivity of the ferrite magnets 3 is 1,000 kA/m. The ferrite magnets 3 each are arranged along with the q-axis between magnetic poles, and the magnetization direction thereof is approximately along with the round of the rotor core 2. The NdFeB magnets 4 each are arranged in the rotor core 2 such that the magnetization direction thereof is the d-axis direction.

Short circuit coils 8 are provided such that they each surround one of the NdFeB magnets 4 embedded in the rotor core 2. Each short circuit coil 8 is made of a ring-shaped conductive member, and fixed such that the short circuit coil 8 is inserted in an edge part of the cavity 5 provided in the rotor core 2. Note that the short circuit coil 8 also can be produced by flowing a conductive material melted by a high temperature in a hole of the rotor core to cast a coil.

The short circuit coil 8 generates a short circuit current using a magnetic flux generated when conduction of a d-axis current through an armature coil is performed. For this reason, the short circuit coil 8 is provided a magnetic path part of a permanent magnet (NdFeB magnet 4) which is other than the "permanent magnet to be irreversibly changed" (ferrite magnet 3). In this case, a short circuit coil 8 is provided on the periphery of a NdFeB magnet 4 with leaving a space between them such that an axis extending in the magnetization direction of the NdFeB magnet 4 is the center axis of the short circuit coil 8.

It is preferable that the short circuit coil 8 is adapted such that a short circuit current flow within one second, which is such as to change a magnetization of the magnet to be irreversibly changed, subsequently, the short circuit current is attenuated by more than 50% within one second. In addition, when an inductance value and a resistance value of the short circuit coil 8 are set such that a short circuit current flow, which is such as to change a magnetization of the magnet (ferrite magnet 3) to be irreversibly changed, the efficiency can be improved.

A stator 10 is provided outside the rotor core 2. The stator 10 has an armature core 11 and armature coils 12. A magnetization current flowing through the armature coil 12 induces an induced current in the short circuit coil 8, as a result, the induced current forms a magnetic flux passing through the short circuit coil 8. In addition, a magnetization current that flows through the armature coil 12 causes to irreversibly change the magnetization direction of the ferrite magnet 3.

In more detail, with regard to the permanent magnets 3 and 4, during an operation of the permanent magnet electric motor, a magnetic field due to a d-axis current causes to magnetize the permanent magnet 3 to quantitatively and irreversibly change the magnetic flux of the permanent magnet 3. In this case, a q-axis current controls the torque of the motor while a d-axis current flows for magnetizing the permanent magnet 3.

In addition, a magnetic flux due to a d-axis current causes to quantitatively and irreversibly change a flux linkage of the armature coil 12 generated by the permanent magnets 3 and 4 and an electric current (all electric current as a result of synthesizing a q-axis current and d-axis current), that is, a flux linkage of the whole armature coil 12, which is composed of a magnetic flux generated in the armature coil by all electric current of the motor, and a magnetic flux generated by two or more types of permanent magnets.

In particular, in this embodiment, a magnetic field due to an instant and large d-axis current causes to irreversibly change the permanent magnet 3. An operation is performed in this state by flowing a d-axis current continuously within a range that causes an irreversible demagnetization of approximately zero or a little quantity. In such an operation, the d-axis current acts such as to advance a current phase to adjust the terminal voltage.

In addition, an operation control method is performed for inverting the polarity of the changeable magnet 3 using a large d-axis current to advance a current phase. In this way, since a large d-axis current causes an inversion of the polarity of the changeable magnet 3, even if flowing a minus d-axis current that is such as to reduce the terminal voltage, a magnetic field due to the minus d-axis current acts as not a demagnetizing field but a magnetizing field for the changeable magnet 3. Consequently, such a minus d-axis current, without demagnetizing the changeable magnet 3, can contribute to adjustment of the terminal voltage value.

In general magnet motors, since the polarity of a magnet is not inverted, if advancing a current phase to increase a d-axis current, there would be a problem that the magnet is irreversibly demagnetized. On the other hand, in this embodiment, when inverting the polarity of the changeable magnet 3, it is possible to advance a current phase.

{Action of Demagnetization and Magnetization}

Next, action of this embodiment is explained. Note that in each of the drawings, an arrow denotes the direction of a magnetic force that is generated by the armature coil 12 or the short circuit coil 8.

In this embodiment, a pulse-like current is caused to flow through the armature coil 12 of the stator 10, in an extremely short conductive time of the order of 0.1 ms to 1 ms, to generate a magnetic field, as a result, the generated magnetic field A acts the ferrite magnet 3 (see FIG. 1). Here, a pulse current that generates the magnetic field A for magnetizing the permanent magnet, is assumed to be a d-axis current component of the armature coil 12 of the stator 10 is taken.

If the thickness of the two types of permanent magnets is approximately uniform, a range, in which the magnetization state of one type of permanent magnet is changed by an active magnetic field due to a d-axis current, is changed in accordance with the coercivity. Using a minus d-axis current that generates a magnetic field directed to the reverse direction of the magnetization direction of the permanent magnet, conduction of a pulse-like current that flows through the armature coil 12 is performed. If the magnetic field A has reached a value of −280 kA/m, since the coercivity of the ferrite magnet 3 is 280 kA/m, then the magnetic force of the ferrite magnet 3 is irreversibly and significantly reduced.

On the other hand, since the coercivity of the NdFeB magnet 4 is 1,000 kA/m, the magnetic force of the NdFeB magnet 4 is not irreversibly reduced. As a result, when a pulse-like d-axis current has reached a value of zero, since only the ferrite magnet 3 has reached a demagnetized state, a flux linkage due to the whole magnets can be quantitatively reduced. Furthermore, if a reverse magnetic field of a value more than −280 kA/m acts the ferrite magnet 3, then the ferrite magnet 3 is magnetized in the reverse direction to invert the polarity thereof. In this case, the magnetic flux of the ferrite magnet 3 and the magnetic flux of the NdFeB magnet 4 counteract each other to minimize the total flux linkage of the permanent magnets (see FIG. 2).

Note that, as denoted by an arrow "B" in FIG. 1, the direction of the magnetic force of the NdFeB magnet 4 is a direction that is directed from the NdFeB magnet 4 to the ferrite magnet 3, this direction matches with the direction of the magnetic force due to the armature coil 12, as a result, a strong magnetic force acts in the direction that demagnetizes the ferrite magnet 3. At the same time, in the short circuit coil 8, an induced current is generated, which is such as to counteract the magnetic field A of the armature coil 12, as a result, the induced current generates a magnetic field that has a magnetic force of the direction as denoted by an arrow "C" in FIG. 1. The magnetic force C due to the short circuit coil 8 also acts such as to direct the magnetization direction of the ferrite magnet 3 to the reverse direction. As a result of these actions, the demagnetization and inversion of the polarity of the ferrite magnet 3 are performed effectively.

Figure 2:
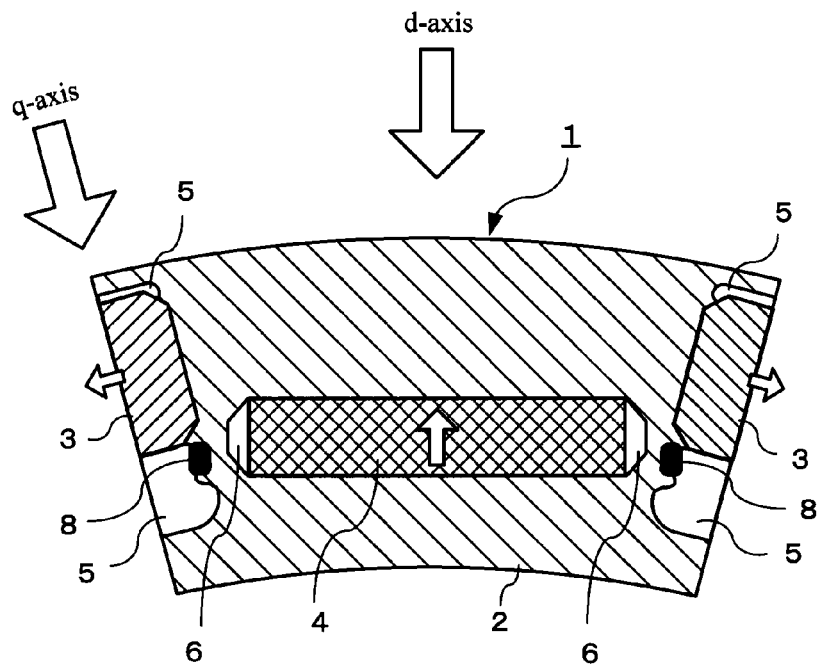
FIG. 2 is a partial sectional view showing the rotor in a state in which magnetic force is a minimum value in the first embodiment of the invention.
Figure 3:
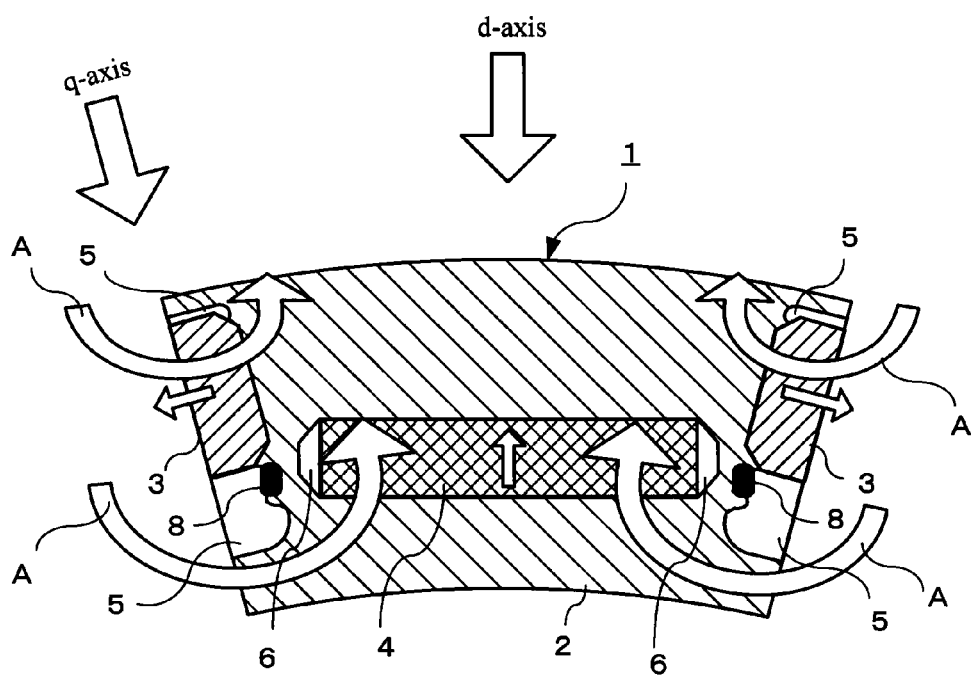
FIG. 3 is a partial sectional view showing the rotor in an instant in which a magnetization current has been started to flow in the first embodiment of the invention.

Next, a process for increasing and maximally restoring the total flux linkage of permanent magnets (magnetization process) is explained. In a completion state of demagnetization, as shown in FIG. 2, the polarity of the ferrite magnet 3 has been invert, and conduction of a plus d-axis current that flows through the armature coil 12 is performed, in which the plus d-axis current generates a magnetic field directed to the reverse direction (initial magnetization direction shown in FIG. 1) of the inverted magnetization direction. The magnetic force of the ferrite magnet 3 of the inverted and reverse polarity is reduced in proportion to increase of the magnetic field to reach a value of zero. From this state, when the magnetic field due to the plus d-axis current is further increased, the polarity of the ferrite magnet 3 is inverted to be restored to the initial polarity, and the ferrite magnet 3 is magnetized in the initial direction. If the magnetic field is caused to reach a value of 350 kA/m that is required for approximately full magnetization, then the ferrite magnet 3 is fully magnetized to generate an approximately maximum magnetic force (see FIG. 3).

Figure 5:
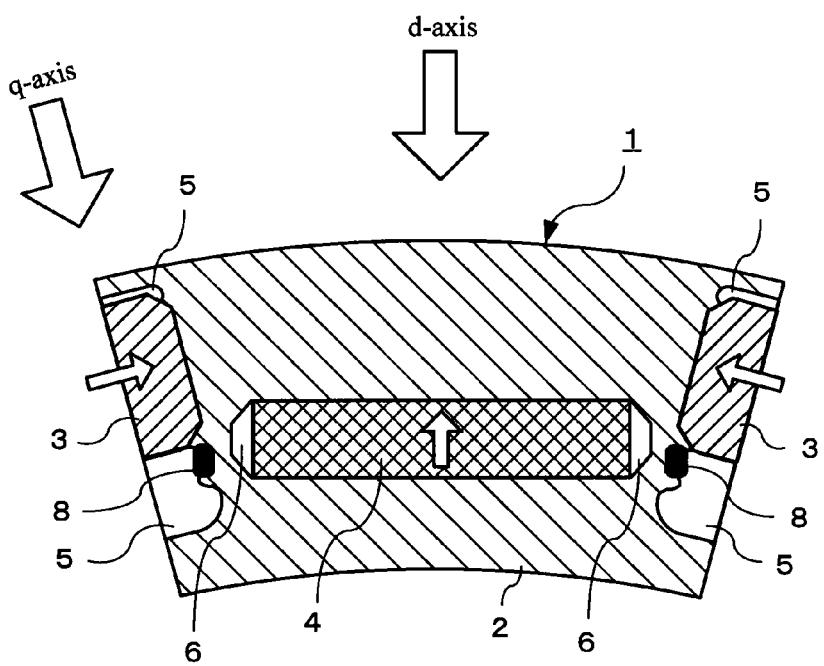
FIG. 5 is a partial sectional view showing the rotor in a state in which magnetization has ended so that a magnetization current value has been changed into zero in the first embodiment of the invention.

Note that it is unnecessary to increase a d-axis current by continuous conduction, what is required for a current used for reaching an objective magnetic force, is only to flow an instant pulse current. On the other hand, since the coercivity of the NdFeB magnet 4 is 1,000 kA/m, even if a magnetic field due to a d-axis current acts on the NdFeB magnet 4, the magnetic force of the NdFeB magnet 4 is not irreversibly changed. As a result, when a pulse-like plus d-axis current reaches a value of zero, the whole permanent magnets have reached a state in which only the ferrite magnet 3 has been magnetized, this can contribute to quantitatively increase the flux linkage due to the whole permanent magnets. This can restore the flux linkage to the original maximum flux linkage (FIG. 5).

As described above, an instant magnetic field due to a d-axis current acts on the ferrite magnet 3 and the NdFeB magnet 4, to irreversibly change the magnetic force of the ferrite magnet 3, as a result, it is possible to quantitatively and voluntarily change the total flux linkage of the permanent magnets.

{Action of Short Circuit Coil}

Next, action of the short circuit coil 8 is explained. Since the ferrite magnet 3 and the NdFeB magnet 4 are embedded in the rotor core 2 to configure a magnetic circuit, an above-described magnetic field due to a d-axis current acts on not only the ferrite magnet 3 but also the NdFeB magnet 4. Essentially, the magnetic field due to a d-axis current is generated so as to change the magnetization of the ferrite magnet 3. So it is preferable to cause the magnetic field due to a d-axis current not to act on the NdFeB magnet 4 but to be concentrated on the ferrite magnet 3.

Figure 4:
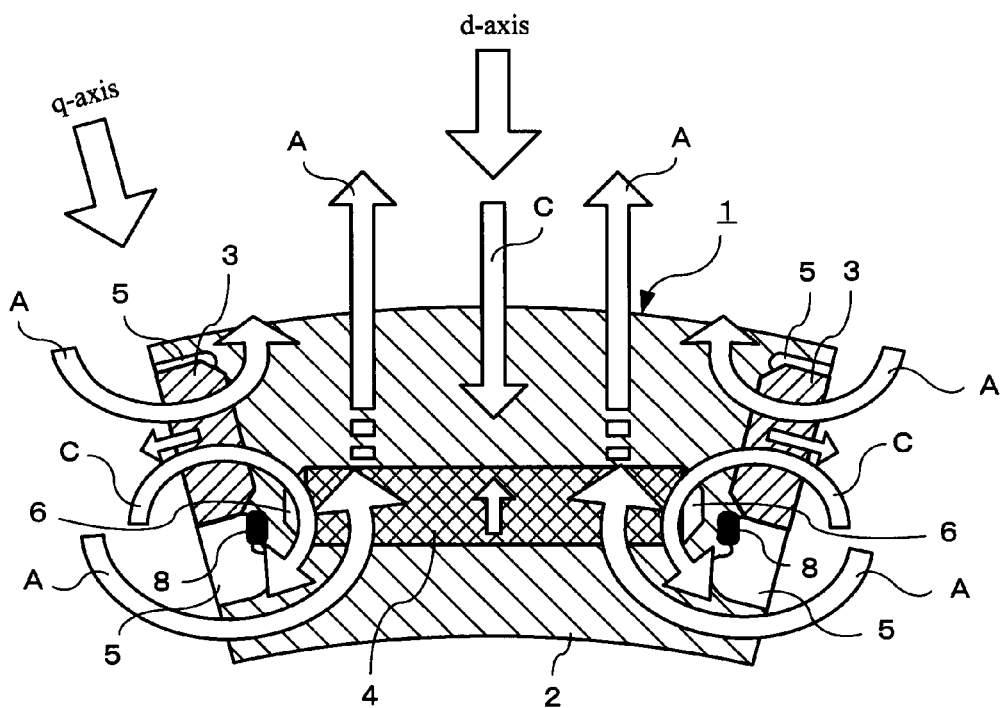
FIG. 4 is a partial sectional view showing the rotor in a state in which a magnetic field due to a magnetization current has generated an induced current in a short circuit coil so that a new magnetic field has generated in the first embodiment of the invention.

In this embodiment, the short circuit coil 8 is located on the periphery of the NdFeB magnet 4. Here, the short circuit coil 8 is located such that an axis extending in the magnetization direction of the NdFeB magnet 4 is the center axis of the short circuit coil 8. When magnetization in the magnetization direction is performed for the "permanent magnet to be irreversibly changed" 3 as shown in FIG. 4, if the magnetic field A due to a d-axis current acts on the NdFeB magnet 4, then an induced current that is such as to counteract the magnetic field A is caused to flow through the short circuit coil 8. Consequently, the magnetic field A due to a d-axis current and the magnetic field C due to a short circuit current act on the NdFeB magnet 4 to counteract each other in the NdFeB magnet 4, as a result, fluctuation of the magnetic fields is generated little or nothing. Further, the magnetic field C due to a short circuit current also acts on the ferrite magnet 3 to be directed to the same direction of the magnetic field A due to a d-axis current in the ferrite magnet 3 (FIG. 4).

Consequently, the magnetic field A that magnetizes the ferrite magnet 3 is enhanced to allow a small d-axis current to magnetize the ferrite magnet 3. This action is obtained not limited to the magnetization direction shown in FIG. 4 but also to the demagnetization direction. As explained above referring to FIG. 1, when a magnetization current directed to the demagnetization direction generates the magnetic field A directed to the reverse direction of the magnetization direction of FIG. 4, an induced current that is induced in the short circuit coil 8, generates the magnetic field C. In this stage, in a part of the "permanent magnet to be irreversibly changed" 3 in which the magnetic field C passes through, the direction of the magnetic field C matches the direction of the magnetic field A due to a magnetization current, as a result, the magnetization of the demagnetization direction also can be performed effectively.

In addition, with the short circuit coil 8, the NdFeB magnet 4 is not affected by the d-axis current, and the magnetic flux is increased little or nothing, as a result, a magnetic saturation of the armature core 11 can be alleviated. In other words, if using no short circuit coil differently from this embodiment, in the armature core 11, the magnetic field A generated by a d-axis current passes through a magnetic path that is formed between the armature coils 12, as a result, there is a possibility of generating a magnetic saturation. However, in this embodiment, among the magnetic field C of the short circuit coil 8, a part that passes through a magnetic path of the armature core 11, acts in the reverse direction of the direction of the magnetic field A due to a d-axis current, as a result, a magnetic saturation in the magnetic path of the armature core 11 can be alleviated.

Advantageous Effects

With this embodiment, the following effects can be obtained.

In this embodiment, a d-axis current causes the ferrite magnet 3 to be irreversibly changed, as a result, the total flux linkage of the permanent magnets including the ferrite magnet 3 and the NdFeB magnet 4, can be quantitatively adjusted over a wide range. In addition, since an induced current that flows through the short circuit coil 8, can enhance the influence of a magnetic field due to a d-axis current on a magnet the magnetic force of which is changed (ferrite magnet 3), the ferrite magnet 3 can be magnetized by a small d-axis current. For this reason, the capacitance of an inverter can be reduced.

Since the short circuit coil 8 can enhance a magnetic field that magnetizes the permanent magnets, a permanent magnet having a high coercivity can be used for the "permanent magnet to be irreversibly changed". For example, a ferrite magnet 3 (coercivity of 280 kA/m), the coercivity of which is more than that of an Al—Ni—Co magnet (coercivity of 120 kA/m), can be magnetized to allow the magnetic force thereof to be changed.

As a result, adjustment of the total flux linkage of the permanent magnet can adjust the voltage of the motor over a wide range. In addition, since magnetization is by a pulse-like current in an extremely short time, without constantly and continuously a current for the "flux weakening control", loss can be reduced significantly. In addition, since it is unnecessary to perform the "flux weakening control", no iron loss due to a harmonic flux is generated.

Consequently, with the motor of this embodiment, a variable speed operation can be achieved at a high power output over a wide range of from a low speed to a high speed, and a high efficiency also can be achieved over a wide operation range.

Second Embodiment

Figure 6:
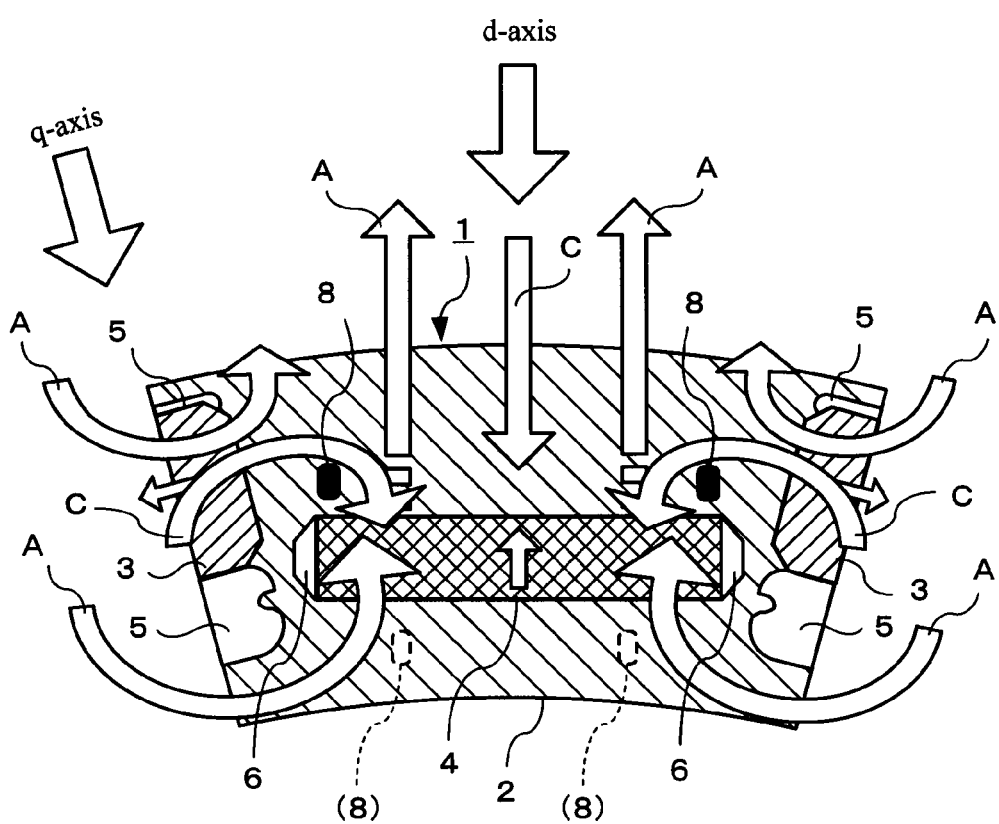
FIG. 6 is a partial sectional view showing a rotor and the direction of a magnetic force in a second embodiment of the invention.

FIG. 6 is a sectional view showing a rotor part in a second embodiment of this invention. In this embodiment, the arrangement of the short circuit coil 8 is different from that of the first embodiment. In this embodiment, the short circuit coil 8 is provided in a permanent magnet (NdFeB magnet 4) other than the "permanent magnet to be irreversibly changed", on the stator side of the "other magnet" (NdFeB magnet 4) such that an axis extending in the magnetization direction in the center part of the "other magnet" (NdFeB magnet 4) is the center axis of the short circuit coil 8. In this case, the short circuit coil 8 is embedded in the rotor core 2 such that the short circuit coil 8 faces the "other magnet" (NdFeB magnet 4) with leaving a space between them.

In the second embodiment of this configuration, as with the first embodiment, a magnetic field generated by a magnetization current induces an induced current in the short circuit coil 8. Then the magnetic field C generated by the induced current and the magnetic field A magnetize the ferrite magnet 3 in the magnetization direction. At the same time, since the magnetic field C of the short circuit coil 8 also act such as to counteracts the magnetic field A due to a magnetization current generated in the armature core 11, a magnetic saturation of the armature core 11 can be alleviated.

Note that in the second embodiment, the short circuit coil denoted by a symbol "8" in FIG. 6, is located on the stator side of the NdFeB magnet 4, but the location of the short circuit coil is not limited to that place, as denoted by a dashed line and symbol "(8)", the short circuit coil also can be located on the center side of the rotor core 2 compared with the NdFeB magnet 4. In addition, instead of that the short circuit coil is embedded in the rotor core 2, in the surrounding part of the NdFeB magnet 4, the short circuit coil may be wound about the rotor core 2, in the surrounding part of the NdFeB magnet 4, on the center or outer side of the rotor core 2 compared with the NdFeB magnet 4, in this case, the same effects can be obtained.

Third Embodiment

Figure 7:
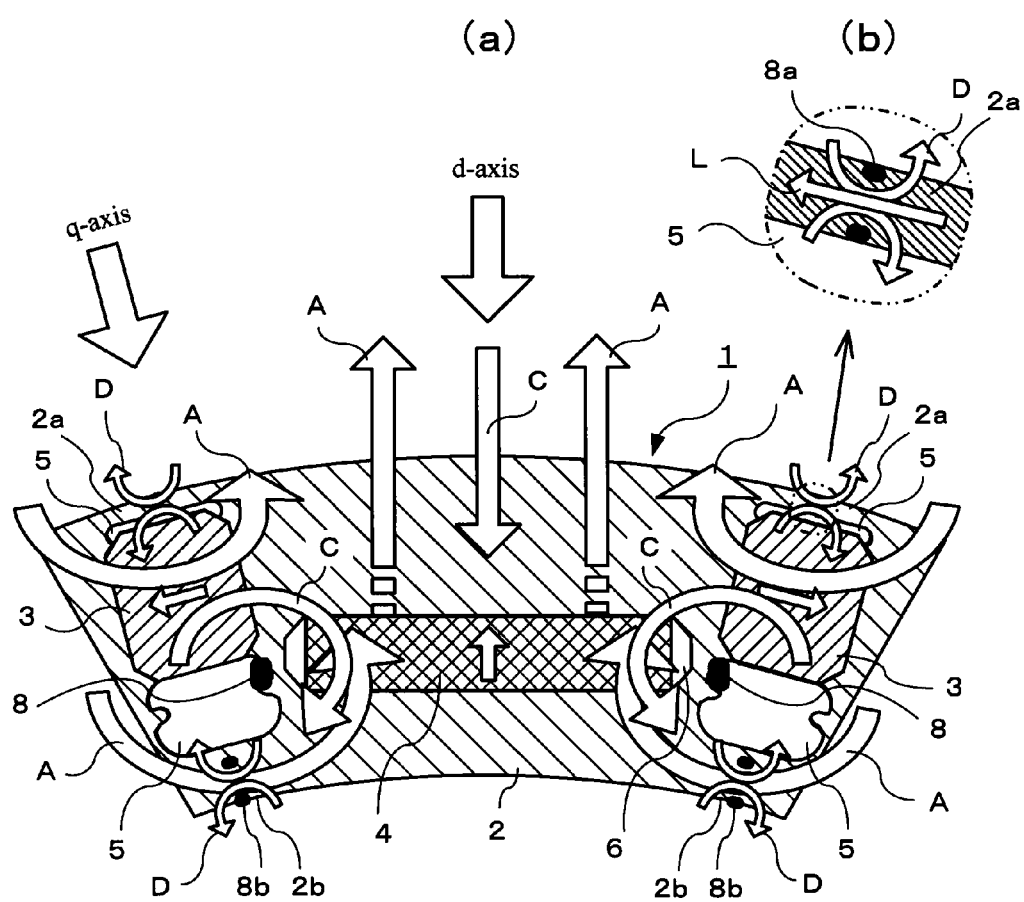
FIG. 7 is a partial sectional view showing a rotor and the direction of a magnetic force in a third embodiment of the invention.

FIG. 7(*a*) is a sectional view showing a rotor part in a third embodiment of this invention, and FIG. 7(*b*) is a partial enlarged sectional view showing in an enlarged manner a part of the rotor core shown in FIG. 7(*a*). In the third embodiment, the short circuit coil is provided in the rotor core 2, in a magnetic path part that allows a magnetic flux to leak, which is other than the "permanent magnet to be irreversibly changed" 3. In FIG. 7, as an example, short circuit coils 8*a* and 8*b* are provided in "magnetic path parts that allows a magnetic flux to leak" of the rotor core 2 in the radial direction of the location of the "permanent magnet to be irreversibly changed" 3, and other than the permanent magnet 3. In other words, in the radial direction of the rotor core 2, narrow parts 2*a* and 2*b* of the core are formed between the cavities 5 provided at the opposite ends of the "permanent magnet to be irreversibly changed" 3, and the surfaces of the outer and center sides of the rotor core 2. As shown in FIG. 7(*b*), since the magnetic field A allows a leakage flux L to pass through these narrow parts 2*a* and 2*b*, respectively, these narrow parts 2*a* and 2*b* correspond to the "magnetic path parts that allows a magnetic flux to leak" other than the "permanent magnet to be irreversibly changed" 3. In the third embodiment, in the "magnetic path parts that allows a magnetic flux to leak" 2a and 2b other than the "permanent magnet to be irreversibly changed" 3, short circuit coils 8a and 8b that have a small diameter and act such as to counteract the leakage flux L passing through the parts, are provided, respectively. Note that, in proportion to the extreme narrowness of the outer path part 2a of the rotor core 2, since the short circuit coil 8a provided in the outer path part 2a has an extremely small diameter, the short circuit coil 8a is omitted in FIG. 7(a), and is only shown in the partial enlarged sectional view of FIG. 7(b). As shown in FIG. 7(b), the small diameter short circuit coil 8a of the path part 2a is provided such that an axis extending in the direction of the leakage flux L is the center axis of the short circuit coil 8a. The small diameter short circuit coil 8b of the path part 2b is provided as with the short circuit coil 8a.

In the third embodiment of this configuration, when the magnetic field A generated by a magnetization current induces an induced current to flow in the short circuit coil 8, a magnetic field denoted by a symbol "D" is generated in the short circuit coil 8. Since the magnetic field D acts in the reverse direction of the magnetic field A due to a magnetization current, a magnetic saturation of this part can be alleviated. As a result, an output reduction due to the reduction of a magnetic flux that is effective in driving the motor can be prevented.

In particular, as shown in FIG. 7, the magnetic path parts 2a and 2b that allow the leakage flux L to be generated, form a parallel circuit as a magnetic circuit in relation to the "permanent magnet to be irreversibly changed" 3. Consequently, the magnetic field D, which is generated the small diameter short circuit coils 8a and 8b and acts such as to counteract the leakage flux L, also acts on the "permanent magnet to be irreversibly changed" 3, which is magnetically connected the leakage flux part. Since the direction of the magnetic field D is the same as that of the magnetic field A, an effect of promotion of magnetizing the "permanent magnet to be irreversibly changed" 3, can be obtained.

Forth Embodiment

Figure 8:
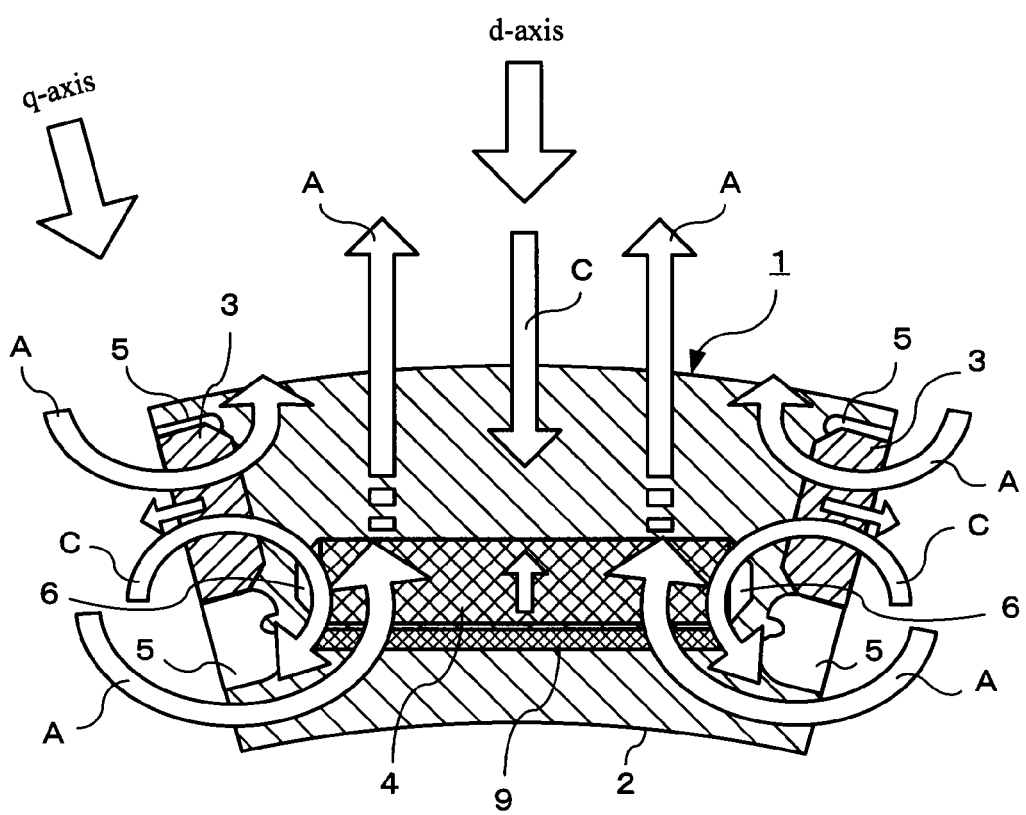
FIG. 8 is a partial sectional view showing a rotor and the direction of a magnetic force in a fourth embodiment of the invention.
Figure 9:
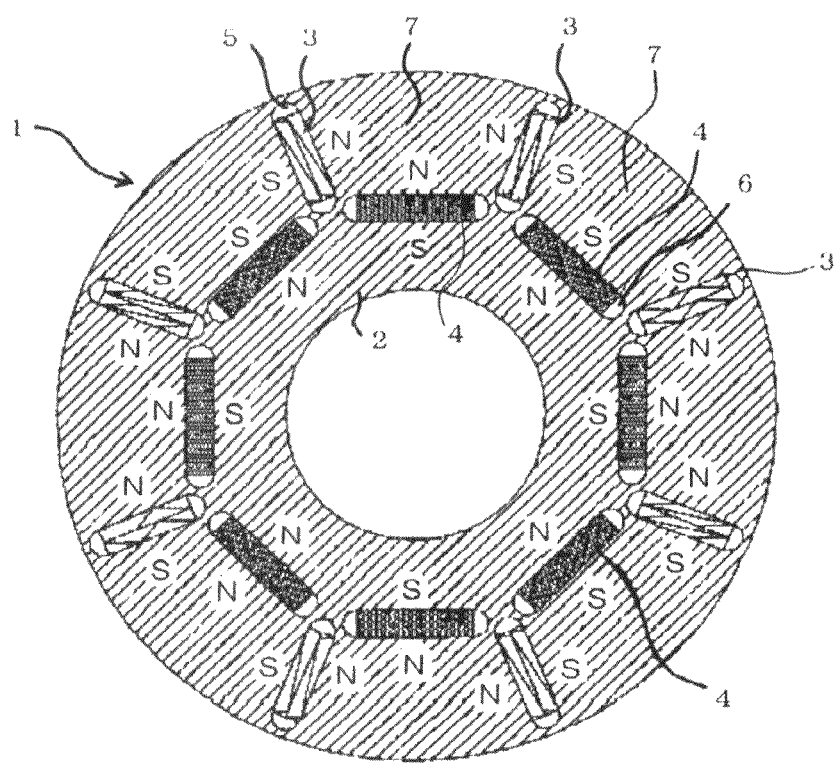
FIG. 9 is a sectional view showing a rotor described in Patent Document 1.
Figure 10:
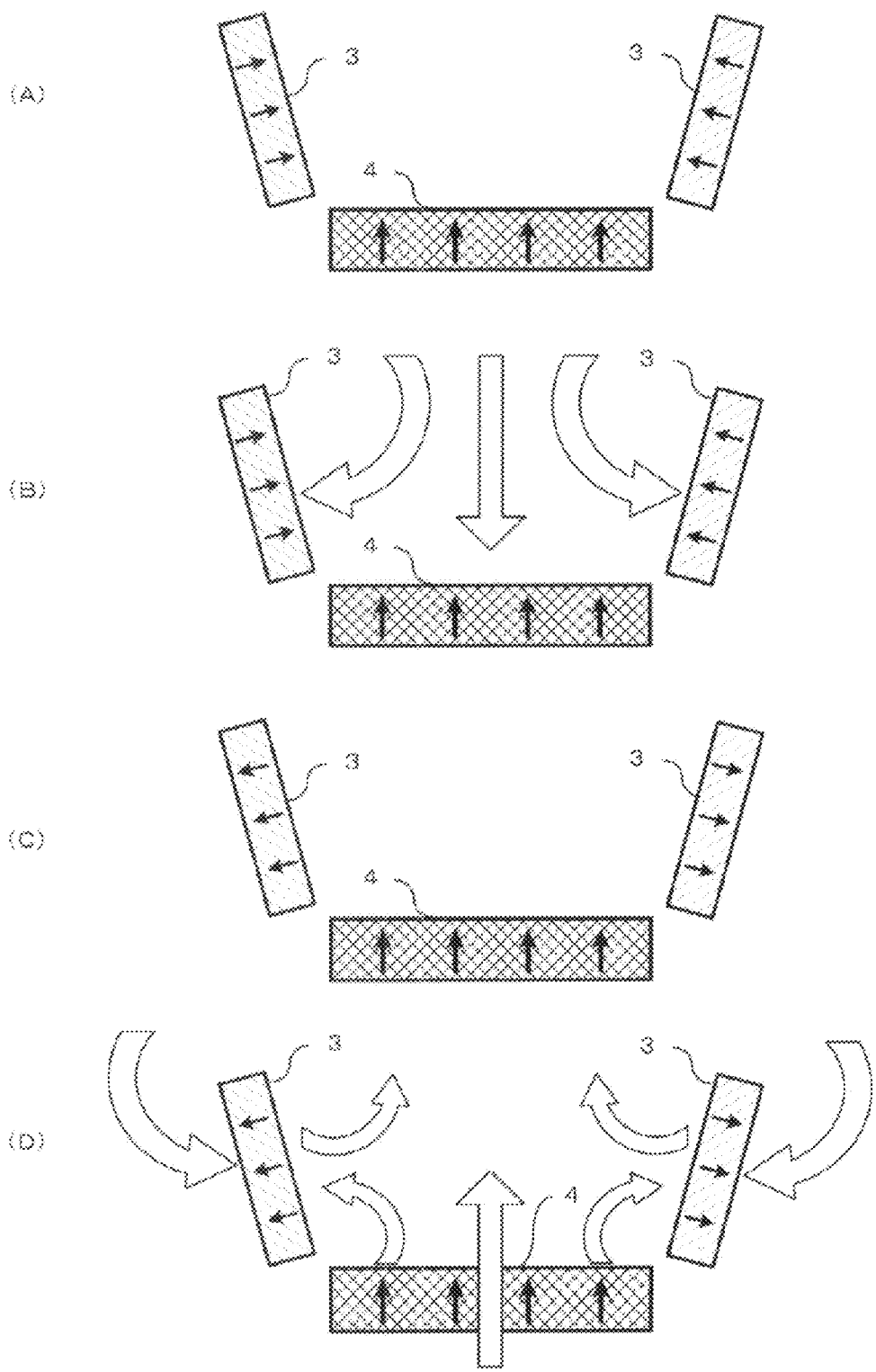
FIG. 10 is a schematic diagram showing an action of the rotor described in Patent Document 1.

FIG. 8 is a sectional view showing a rotor part in a fourth embodiment of this invention. In the fourth embodiment, a conductive plate 9 instead of the short circuit coil 8, is provided on a surface that faces a surface of the NdFeB magnet 4, the surface of which is shown as one main surface on the bottom side of the NdFeB magnet 4 in the drawing view (the center side of the rotor). That is, the conductive plate 9 is provided on a surface that faces the NdFeB magnet 4 in the magnetization direction thereof.

Preferably, a copper plate or an aluminum plate is used as the conductive plate 9. In addition, the conductive plate 9, not limited to the location on the bottom side of the NdFeB magnet 4 in the drawing view (the center side of the rotor), also may be located on the top side of the NdFeB magnet 4 in the drawing view (the outer side of the rotor). When the conductive plate 9 is located on the outer side of the rotor, a merit can be obtained in which current harmonics or slot harmonics generate an induced current in the conductive plate to reduce the harmonics.

In the forth embodiment of this configuration, when the magnetic field generated by a magnetization current is applied to the conductive plate 9, an induced current (eddy current) is generated in a surface part of the conductive plate 9, as a result, the magnetic field C is generated, as with the short circuit coil 8. The magnetic field C allows a magnetic force to be applied to the ferrite magnet 3 to allow the magnetization to be performed effectively. At the same time, a magnetic saturation of the armature core 11 can be alleviated.

Other Embodiments

This invention is not limited to the above embodiments, and may include other embodiments as follows.
(1) The above-described embodiments, a case of 12 pole motor is explained, but needless to say, this invention can be similarly applied to various motors having another number of poles. Of course the location and shape of permanent magnets may be somewhat changed in accordance with the number of poles, but the same action and effects as those of the above-described embodiments can be obtained.
(2) In this invention, with relation to permanent magnets for forming a pole, the definition of the permanent magnets is given by the product of the coercivity and the thickness in the magnetization direction. Consequently, even if a magnetic pole is formed by the same type of permanent magnets that have different values as the thickness in the magnetization direction, he same action and effects as those of the above-described embodiments can be obtained.
(3) The third embodiment also can be appropriately combined with any one or more of the first, second and fourth embodiments.
(4) The motor may be adapted such that, during an operation, a permanent magnet is magnetized by a magnetic field generated by a pulse-like d-axis current in an extremely short time to quantitatively and irreversibly change the magnetic flux thereof, and conduction of a current is continuously performed in which a phase of the current is advanced in relation to an induced voltage of all magnets to quantitatively change the flux linkage of the armature coil generated by the current and the permanent magnet.

In this motor, when reducing the magnetic flux of the permanent magnet by a pulse-like current, subsequently, advancing a current phase, since a magnetic flux directed in the reverse direction of the magnetic flux of the permanent magnet is generated by the current, it is possible to offset the magnetic flux, as a result, the total flux linkage can be reduced and the terminal voltage can be reduced. Note that advancing a current phase is equivalent to flowing a minus d-axis current component.

In such a current phase advance control, advancing a current phase allows a d-axis current to flow to demagnetize the magnet so that the magnetic flux is somewhat reduced. However, extremely demagnetizing by a pulse current, makes a merit of a small reduction ratio in magnetic flux.

The invention claimed is:
1. A permanent magnet electric motor comprising:
a plurality of magnetic poles formed by using two types of permanent magnets, a product of coercivity and thickness in a magnetization direction of permanent magnets of a first type being smaller than that of permanent magnets of a second type;
a rotor formed by locating the plurality of the magnetic poles inside a rotor core;
a stator located outside the rotor, the rotor and the stator having an air gap intervening therebetween; and
an armature core and an armature coil provided with the stator,
wherein at least one permanent magnet with the smaller product of the permanent magnets configuring each of the plurality of magnetic poles of the rotor is magnetized by a magnetic field generated by an armature current of the armature coil so as to irreversibly change an amount of magnetic flux of the at least one permanent magnet, and a short circuit coil is located on the periphery of a first selected one of the permanent magnets excluding the permanent magnets of the second type so as to have an axis extending in a magnetization direction of the first selected one of the permanent magnets as a center axis of the short circuit coil, wherein the magnetic field generated by the armature current of the armature coil induces a short circuit current in the short circuit coil, the short circuit current generating a magnetic field that has a direction which is opposite from the direction of the magnetic field generated by the armature current on the first selected one of the permanent magnets and is the same as the direction of the magnetic field generated by the armature coil on the at least one permanent magnet with the smaller product.

2. The permanent magnet electric motor according to claim 1, wherein the armature current specifies a d-axis current, which is conducted through the armature coil so as to generate a magnetic flux passing through the short circuit coil, which induces the short circuit current.

3. The permanent magnet electric motor according to claim 2, wherein the at least one permanent magnet with the smaller product is irreversibly changed.

4. The permanent magnet electric motor according to claim 1, wherein the short circuit coil is held by a centrifugal force during a high speed rotation of the rotor core.

5. The permanent magnet electric motor according to claim 1, wherein the short circuit coil is made by casting a melted conductive material in a hole of the rotor core.

6. The permanent magnet electric motor according to claim 1, wherein an operation for advancing a current phase is performed in a state in which the at least one permanent magnet having the smaller product has been demagnetized resulting in inversion of the polarity thereof.

7. The permanent magnet electric motor according to claim 1, wherein during an operation, the at least one permanent magnet with the smaller product is magnetized by the magnetic field generated by the armature current, which specifies a pulse-like d-axis current, in a time duration of 0.1 millisecond to 1 millisecond to irreversibly change the amount of the magnetic flux thereof, and a current having an advanced phase in relation to an induced voltage corresponding to all of the permanent magnets is continuously conducted through the at least one permanent magnet with the smaller product so as to change an amount of flux linkage of the armature coil generated by the armature current and the at least one permanent magnet with the smaller product.

* * * * *